United States Patent [19]

Gibbs

[11] Patent Number: 4,477,412

[45] Date of Patent: Oct. 16, 1984

[54] SURFACE-AREA STABILIZATION OF FUMED SILICA

[75] Inventor: Marylu B. Gibbs, Baton Rouge, La.

[73] Assignee: The Dow Chemical Company, Midland, Mich.

[21] Appl. No.: 111,746

[22] Filed: Jan. 14, 1980

[51] Int. Cl.$^3$ .............................................. C01B 33/18
[52] U.S. Cl. ....................................... 422/40; 423/335; 423/336; 423/337
[58] Field of Search ....................... 423/335, 336, 337; 422/9, 40

[56] References Cited

U.S. PATENT DOCUMENTS 3,053,627  9/1962  Flemmert .......................... 423/336
3,269,799  8/1966  Gunn ................................. 423/336

Primary Examiner—Jack Cooper
Attorney, Agent, or Firm—A. J. Young

[57] ABSTRACT

A method for reducing surface-area decay of fluoride-containing fumed silica which comprises the step of providing an atmosphere of inert gas in which the fumed silica is disposed. The method, which can be used at ambient temperature, is particularly effective for the storage of a fluoride-containing fumed silica product prepared by a fluoride process, which fumed silica contains between about 2 and about 4 percent fluoride by weight.

6 Claims, No Drawings

SURFACE-AREA STABILIZATION OF FUMED SILICA

BACKGROUND OF THE INVENTION

This invention relates to a method of stabilizing fumed silica with respect to its retention of surface area. More specifically, the invention relates to a method of reducing the detrimental surface-area decay of fumed silica after it has been produced, wherein the silica contains an appreciable amount of chemically or physically bound fluoride.

Typically, fluoride-containing fumed silica is prepared by the flame hydrolysis of silicon tetrafluoride and contains about two to about four percent chemically and/or physically bound fluoride by weight. Such fumed silica is unstable in regard to the retention of its surface area under ordinary storage conditions, unless it has first been defluorinated. It is known that the surface area of fumed silica, which contains more than about 1.5% fluoride by weight, decreases rapidly and detrimentally under ordinary conditions. In a two-week storage period the surface area of such a fumed-silica product may decrease to as low as forty percent or less of its original value. It is also known that by defluorinating fumed silica, the same becomes increasingly stable under ordinary conditions and will not substantially change when the fluoride content is reduced to a level of about 400 to about 2100 parts per million by weight. However, it would be beneficial to be able to store high-fluoride-containing fumed silica with as little loss of surface area as possible, for example (1) when the defluorinator section of a plant is inoperative, and (2) when high-fluoride-containing silica is the desired end-product.

SUMMARY

In general, the present invention provides a method for reducing the detrimental surface area decay of fluoride-containing fumed silica during storage which comprises the step of providing an atmosphere of an inert gas in which the fumed silica is disposed. Inert gas as defined herein means a gas which is substantially unreactive with the fluoride-containing fumed silica.

The retention of a desired surface area of a fluoride-containing fumed silica product during storage is dependent on many variables. The most important of these variables are the fluoride content of the fumed silica as produced, the surface area of the silica when produced as compared to the desired surface area after storage, the length of time required for storage, and the water vapor content in the storage atmosphere. It has been found that if an atmosphere comprising an inert gas having a substantially reduced water vapor content is used to store the fluoride-containing fumed silica, the effect of the other major variables on the final desired surface area of the fumed silica can be substantially reduced or eliminated, i.e., the final desired surface area of the fumed silica can be controlled by using as a storage atmosphere an inert gas having a reduced water vapor content.

It is an object of this invention to provide a method of stabilizing the surface area decay of fluoride-containing fumed silica. It is still another object of the invention to provide a method therefor which does not require or result in the substantial reduction of the fluoride content of the silica. Other objects of the invention will be apparent to those skilled in the art from the foregoing description and from the more detailed description and examples which follow.

DESCRIPTION OF THE PREFERRED EMBODIMENTS

The following description illustrates the manner in which the principles of this invention are applied, but it is not to be construed as in any way limiting the scope of the invention.

More specifically, the present invention is utilized by observing the following preferred conditions:

(1) Storage temperatures are preferably kept below about 400° C., and most preferably below about 100° C., in order to prevent defluorination of the fumed silica thereby substantially retaining the fluoride content of the fumed silica as it was produced.

(2) The inert gas is substantially dry air or substantially dry nitrogen, and most preferably has a water vapor content of about 0.2 grams per kilogram of gas or less.

(3) The method is applied to a fumed-silica product made by a fluoride process, which product typically contains between about two and about four percent fluoride by weight, and has a surface area of between about one-hundred and about four-hundred square meters per gram ($m^2/g$).

The method of the invention is further illustrated by the following examples.

EXAMPLE 1

About one-hundred pounds (45 kilograms) of fumed silica containing approximately three percent fluoride by weight was put into an aluminum storage hopper and subjected to a very slow purge of dry nitrogen (no measurable water vapor content) at ambient temperatures. The silica was sampled periodically, and surface-area measurements were made on the samples. During the first thirteen days of storage the nitrogen purge was not used. During this period of time the surface area of the sample deteriorated from an initial 333 $m^2/g$ down to 277 $m^2/g$. Thereafter the nitrogen purge was started, and the surface area of the silica remained constant (between 277 and 279 $m^2/g$) within experimental error. The pertinent data are tabulated below in Table I.

TABLE I

| Storage Time (days) | Surface Area ($m^2/g$) |
|---|---|
| 0 | 333 |
| 13 | 277 |
| 19 | 279 |
| 34 | 278 |

EXAMPLE 2

A number of one-pound samples (0.45 kilograms) of fumed silica was held for a period of several days under a number of different experimental conditions. The results with respect to retention of surface area are indicated below in Table II, together with the corresponding experimental conditions.

TABLE II

| Storage Time (Days) | Surface Area ($m^2/g$) | | | |
|---|---|---|---|---|
| | (1) Kept Under Very Dry Nitrogen Pad | (2) Slow Purge With Very Dry Air | (3) Slow Purge With Dry Air | No Treatment |
| 0 | 321 | 321 | 321 | 321 |

TABLE II-continued

| Storage Time (Days) | Surface Area (m²/g) | | | No Treatment |
|---|---|---|---|---|
| | [1] Kept Under Very Dry Nitrogen Pad | [2] Slow Purge With Very Dry Air | [3] Slow Purge With Dry Air | |
| 1 | 321 | 317 | 321 | 312 |
| 3 | 329 | 320 | 323 | 304 |
| 6 | 319 | 318 | 314 | 266 |
| 17 | 303 | 319 | 316 | 260 |
| 24 | 300 | 304 | 305 | 253 |

[1] slow purge for about fifteen minutes with very dry nitrogen and then maintained in a static atmosphere of very dry nitrogen having no measurable water vapor content.
[2] continuous slow purge with very dry air having no measurable water vapor content.
[3] continuous slow purge with dry air having a water vapor content of about 0.2 grams per kilogram of air.

While certain representative embodiments and details have been shown for the purpose of illustrating this invention, it will be apparent to those skilled in the art that various changes and modifications can be made therein without departing from the spirit and scope of the invention.

What is claimed is:

1. A method for reducing the surface-area decay of fluoride-containing fumed silica during storage, comprising the step of providing an atmosphere of an inert gas in which the fumed silica is disposed, said inert gas having a water vapor content of about 0.2 grams per kilogram of gas or less.

2. The method of claim 1 wherein the inert gas is substantially dry air or substantially dry nitrogen.

3. The method of claim 2 wherein the fumed silica is made by flame hydrolysis of silicon tetrafluoride.

4. The method of claim 3 wherein the temperature for storage of the silica is kept below about 400° C.

5. The method of claim 4 wherein the temperature for storage of the silica is kept below about 100° C.

6. The method of claim 5 wherein the silica as produced contains between about two percent and about four percent fluoride by weight and has a surface area of between about one-hundred and about four-hundred square meters per gram.

* * * * *